(12) United States Patent
Gladfelter

(10) Patent No.: US 8,966,824 B2
(45) Date of Patent: Mar. 3, 2015

(54) COLD STATIC GASKET FOR COMPLEX GEOMETRICAL SEALING APPLICATIONS

(75) Inventor: Harry F. Gladfelter, Kimberton, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 835 days.

(21) Appl. No.: 12/904,521

(22) Filed: Oct. 14, 2010

(65) Prior Publication Data

US 2011/0024996 A1 Feb. 3, 2011

Related U.S. Application Data

(62) Division of application No. 11/479,081, filed on Jun. 30, 2006, now Pat. No. 7,829,001.

(51) Int. Cl.
*E06B 7/22* (2006.01)
*F16J 15/02* (2006.01)
(Continued)

(52) U.S. Cl.
CPC ............... *F16J 15/024* (2013.01); *B29C 65/02* (2013.01); *B29C 66/1142* (2013.01);
(Continued)

(58) Field of Classification Search
USPC .............................................. 49/475.1, 498.1
See application file for complete search history.

(56) References Cited

U.S. PATENT DOCUMENTS 2,717,025 A 9/1955 Jelinek
2,859,061 A 11/1958 Reid
(Continued)

FOREIGN PATENT DOCUMENTS

JP 63280967 11/1988

OTHER PUBLICATIONS

"Injection Moulding of Silastic Liquid Silicone Rubber," Published by Dow Corning Corporation, Copyrighted 1998, 200, pp. 1-30.
(Continued)

*Primary Examiner* — Jerry Redman
(74) *Attorney, Agent, or Firm* — Robert L. Stearns; Dickinson Wright, PLLC

(57) ABSTRACT

A gasket assembly (20) and method for forming the gasket assembly (20) for sealing two mating surfaces (46,48) over a complex geometrical contact region. The gasket assembly (20) is formed by a hollow silicone rubber tube (22) having a naturally straight configuration but easily bent into complex configurations without kinking. The tube (22) is filled with a curable liquid rubber compound (30) and then the ends (24, 26) of the tube (22) are joined in end-to-end fashion to form a continuous loop. The joined ends (24,26) of the tube (22) can be reinforced with a connector (34,134) and then locally cured on a preliminary operation so that the liquid rubber compound (30) does not escape. The tube (22) is then laid up in a mold (40) having a complex geometrical feature (42) which replicates the complex geometrical contact region of the two mating surfaces (46,48) to be subsequently sealed. With the tube (22) held stationary in the mold form (40), the entrapped liquid rubber compound (30) is cured using a heat source (44) or other suitable curing accelerant. Once fully cured, the core of rubber compound (30') takes a set in the complex geometrical form, and resists straightening of the tube (22) so as to hold the gasket assembly (20) in the complex geometrical shape required to later seal the mating surfaces (46,48). The tube (22) and core of cured rubber compound (30') may be selected of materials which possess different durometers.

7 Claims, 3 Drawing Sheets

(51) Int. Cl.
| | |
|---|---|
| *B29C 65/02* | (2006.01) |
| *B29C 65/00* | (2006.01) |
| *B29D 99/00* | (2010.01) |
| *F16J 15/10* | (2006.01) |
| *B29C 35/02* | (2006.01) |
| *B29C 35/08* | (2006.01) |
| *B29K 21/00* | (2006.01) |
| *B29L 31/26* | (2006.01) |

(52) U.S. Cl.
CPC ......... *B29C 66/636* (2013.01); *B29D 99/0053* (2013.01); *F16J 15/108* (2013.01); *B29C 66/52211* (2013.01); *B29C 66/5261* (2013.01); *B29C 35/02* (2013.01); *B29C 2035/0827* (2013.01); *B29K 2021/00* (2013.01); *B29L 2031/26* (2013.01); *B29L 2031/265* (2013.01)
USPC ...................................................... 49/498.1

(56) References Cited

U.S. PATENT DOCUMENTS

| | | | |
|---|---|---|---|
| 3,111,325 A | 11/1963 | Reiling | |
| 3,245,693 A | 4/1966 | Way | |
| 3,660,192 A | 5/1972 | Smith et al. | |
| 3,788,654 A | 1/1974 | Mandley | |
| 4,156,533 A | 5/1979 | Close et al. | |
| 4,194,746 A | 3/1980 | Stevens | |
| 4,218,067 A | 8/1980 | Halling | |
| 4,268,331 A | 5/1981 | Stevens | |
| 4,741,542 A | 5/1988 | Kimerly | |
| 4,958,999 A | 9/1990 | Liscomb et al. | |
| 5,209,599 A * | 5/1993 | Kronenberg | 403/298 |
| 5,243,747 A * | 9/1993 | Mesnel et al. | 29/243.58 |
| 5,396,691 A * | 3/1995 | Wiegand | 29/432.1 |
| 5,470,083 A | 11/1995 | Rinne | |
| 5,476,268 A | 12/1995 | Rinne | |
| 5,538,580 A * | 7/1996 | Moody | 156/257 |
| 5,560,731 A * | 10/1996 | Kronenberg | 403/298 |
| 5,563,203 A | 10/1996 | Yoshino et al. | |
| 6,598,349 B1 * | 7/2003 | Balbaugh et al. | 49/490.1 |
| 2005/0070623 A1 | 3/2005 | Takase et al. | |

OTHER PUBLICATIONS

Product Information Brochure produced by Dow Corning Corporation entitled: "Information about Dow Corning Brand Conformal Coatings" pp. 1-8.

Miscellaneous Printed Material Entitled: "Moulding of Silastic Siicone Rubber," pp. 3-12, believed to be printed by Dow Corning Corporation, circa Jun. 21, 2002.

* cited by examiner

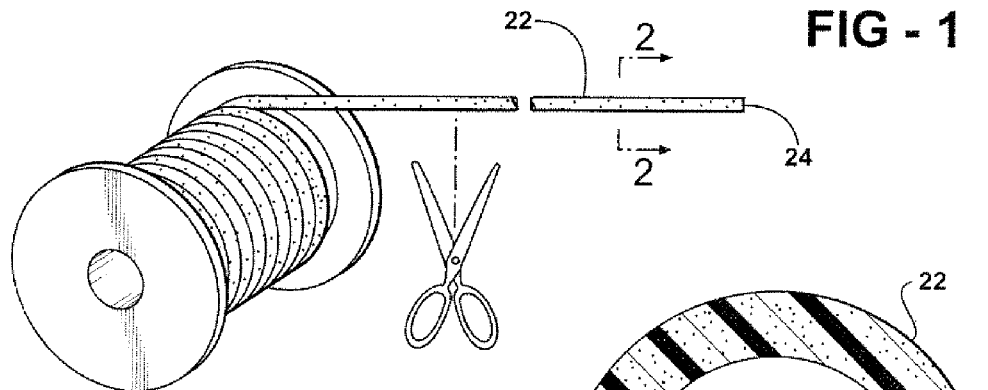
FIG - 1
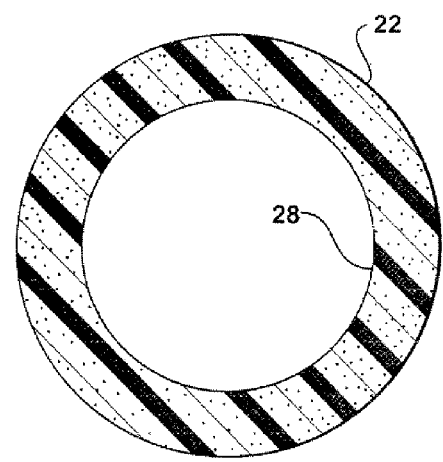
FIG - 2
FIG - 3
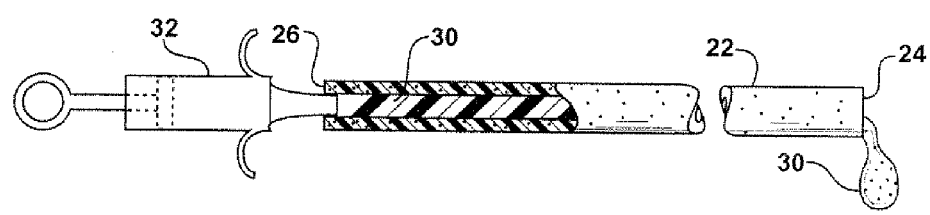
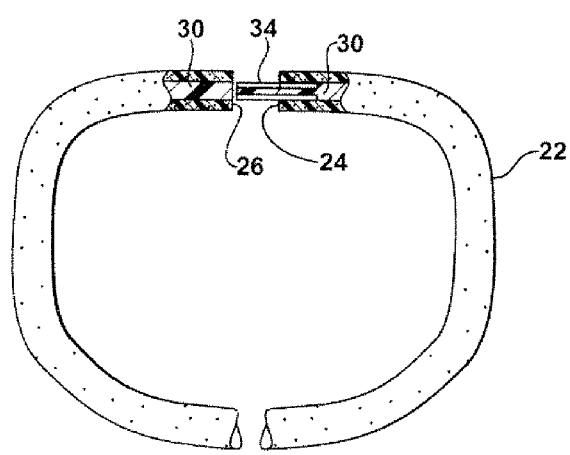
FIG - 4
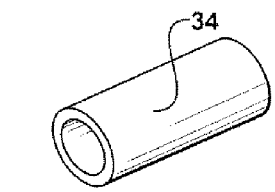
FIG - 5
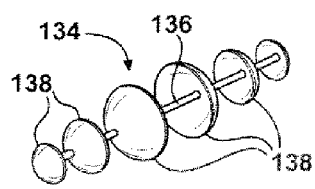
FIG - 5A

COLD STATIC GASKET FOR COMPLEX GEOMETRICAL SEALING APPLICATIONS

This divisional application claims priority to U.S. Ser. No. 11/479,081 filed, Jun. 30, 2006, and is incorporated herein by reference.

BACKGROUND OF THE INVENTION

1. Field of the Invention

The subject invention relates to a cold static gasket of the type for sealing two mating surfaces over a complex geometrical contact region, and more specifically toward a dual-durometer gasket having a resilient rubber sleeve of a first hardness and a core of resilient rubber material having a different hardness than the sleeve.

2. Related Art

Cold static gaskets are used in many applications in which two mating surfaces are required to be sealed over their contact region. A cold static gasket is distinguished from a hot static gasket in that it is not intended for use in extreme heat situations. Although cold static gaskets can be used in almost any field of endeavor. One example of a cold static gasket as used in the vehicular engine field may include an oil pan gasket, a transmission pan gasket, an engine-to-water pump gasket or the like.

In some applications including, but not limited to those exemplary engine applications described above, the contact region between the two mating surfaces to be sealed comprises a complex geometric shape. In other words, the contact region is non-circular, and may or may not include sharp bends, twists and three-dimensional formations. More complex geometrical contact regions can be especially challenging to seal over the life or intended service interval of the cold static gasket. Joint failures are particularly common in areas where the cold static gasket makes sharp bends or curves.

U.S. Pat. No. 3,660,192 to Smith et al., issued May 2, 1972, discloses a circular sealing ring having a resilient core. In this example, a PTFE tube is joined end-to-end and then injected with a liquid silicone rubber composition which eventually solidifies to form a resilient core. In this example, the PTFE tubing acts as a stiff exoskeleton and can be shaped around a mandrel into a desired form, preferably circular. The rigid PTFE tubing then operates like a mold holding the core in a defined ship until it is solidified to form a dual-durometer cold static gasket.

By contrast, U.S. Pat. No. 4,741,542 to Kimerly, issued May 3, 1988, discloses a cold static gasket for sealing a curved aircraft windshield against the fuselage. In this example, a hollow gasket sleeve is placed into an operative position between the windshield and fuselage and held in place by fastening elements. A silicone elastomer or other type of liquid rubber compound is then injected into the hollow interior of the sleeve thereby causing it to expand in the space between the adjacent part surfaces as the injected material cures. This in situ application requires the gasket to be formed in position on an actual aircraft. This is a particular disadvantage because the gasket assembly cannot be constructed in a factory setting and then shipped to another location for installation.

Accordingly, there exists a need for forming a shaped gasket of the type for sealing two mating parts over a complex geometrical contact region that is convenient to mass manufacture in factory settings, inexpensive and suitable for a variety of applications. Likewise, there exists a need for a shaped gasket of the type for sealing two mating surfaces over a complex geometrical contact region.

SUMMARY OF THE INVENTION

According to the invention, a method is provided for forming a shaped gasket of the type for sealing two mating surfaces over a complex geometrical contact region. The method comprises the steps of providing a length of hollow resilient tube extending continuously between first and second opposing ends, filling the entire length of the tube with a curable liquid rubber compound, preventing escape of the uncured liquid rubber compound from the first and second ends of the tube, providing a mold folio having a complex geometrical feature replicating the complex geometrical contact region of the two mating surfaces to be sealed, laying up the tube filled with uncured liquid rubber in the mold form, curing the liquid rubber compound while holding the tube stationary relative to the mold form, removing the tube filled with cured rubber compound from the mold form such that the tube retains the complex geometrical shape of the mold form feature, and then compressing the tube filled with cured rubber compound in an actual service application between two mating surfaces to perfect a seal therebetween.

The subject method overcomes the disadvantages and short comings of the prior art by providing a method in which a composite cold static gasket can be formed into a complex geometrical shape in a factory setting. By laying up the tube filled with uncured liquid rubber in the mold form, it can be shaped into the final geometric configuration as the liquid rubber compound cures. Accordingly, the subject method is particularly adaptable to high production throughput operations.

According to another aspect of the invention, a shaped gasket is provided of the type for sealing two mating surfaces over a complex geometrical contact region. The gasket comprises a hollow, resilient tube extending continuously between first and second ends. The tube has a naturally straight configuration but is easily bent into complex configurations. The first and second ends are joined together in end-to-end fashion to form a loop. A cured liquid rubber compound completely fills the hollow, resilient tube. The cured liquid rubber compound is set in a non-circular geometric shape so that the hollow, resilient tube is forcibly held in the non-circular geometric shape by the core of cured liquid rubber compound. The tube continually strains toward its natural, straight configuration, but is restrained in the complex geometrical shape by the core of cured liquid rubber compound contained therein.

Thus, the subject invention is presented as both a method and as an article of manufacture that will hold its shape while transferred from point of manufacture to point of use. Because the core of cured liquid rubber compound is hardened in the complex geometrical configuration, there are no stress points around corners. The durometer of the tube and the cured liquid rubber compound can be selected of significantly differing hardnesses so as to provide either a tough, hard outside and soft core, or in the alternative a relatively soft outer shell with a dense core material.

BRIEF DESCRIPTION OF THE DRAWINGS

These and other features and advantages of the present invention will become more readily appreciated when considered in connection with the following detailed description and appended drawings, wherein:

FIG. 1 is a simplified perspective view depicting a length of hollow resilient tube being cut from a spool;

FIG. 2 is a cross-sectional view of the tube taken generally along lines 2-2 in FIG. 1;

FIG. 3 is an illustrative view in partial cross-section depicting the step of filling the entire length of the tube with a curable liquid rubber compound;

FIG. 4 illustrates the step of joining the first and second ends of the tube using a bridge-like connector;

FIG. 5 is a perspective view of the bridge-like connector as shown in FIG. 4;

FIG. 5A is a perspective view of an alternative connector having a double-ended so-called "Christmas Tree" style configuration for improved retention;

DETAILED DESCRIPTION OF THE PREFERRED EMBODIMENT

Figure 6:
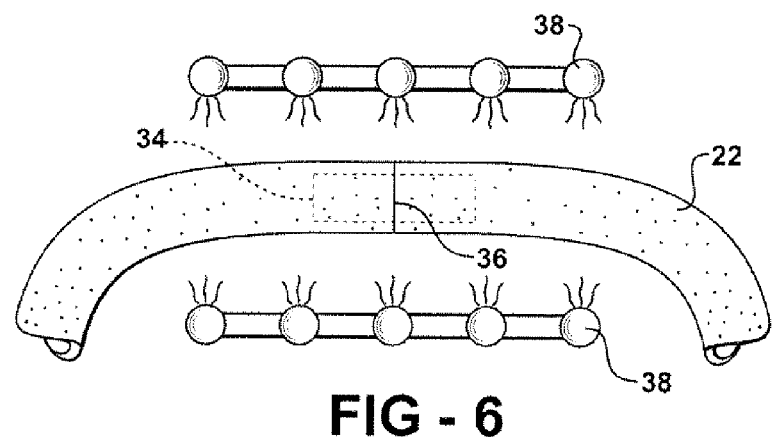
FIG. 6 is a fragmentary view illustrating the step of curing the liquid rubber compound immediately adjacent the first and second ends of the tube so as to retain the tube in a loop configuration.

Referring to the Figures, wherein like numerals indicate like or corresponding parts throughout the several views, a shaped composite gasket of the type for sealing two mating surfaces over a complex geometric contact region is generally shown at 20 in FIGS. 9-12. The shaped gasket 20 is a composite structure comprising an exterior tube 22 fabricated from a hollow, resilient rubber material. Preferably, the material composition of the tube 22 is a silicone rubber tubing having a durometer measure of greater than or equal to 60 Shore A. For example, the silicone rubber tube traded under the name TUFEL®, manufactured by the Advanced Materials business unit of General Electric Company®, has been found to provide suitable results. The tube 22 may be purchased in cut lengths or in spools, as suggested in FIG. 1. In any event, the tube 22 has a naturally straight (or generally straight) configuration but is easily bent into complex configurations without kinking. The tube 22, once cut, has first 24 and second 26 ends defining the full longitudinal length of the tube 22. As shown in FIG. 2, the tube 22 preferably has a naturally round, or annular, cross-section with an inner wall 28 defining an elongated, cylindrical hollow interior cavity.

During the manufacturing process, the hollow interior of the tube 22 is filled with a curable liquid rubber compound 30, as illustrated in FIG. 3. The tube 22 is filled along its entire length with the curable liquid rubber compound using any applicable means. A positive displacement injection device 32 is illustrated in FIG. 3. However, those of skill will appreciate other various methods for filling the entire length of the tube 22 with the liquid rubber compound 30, such as by connection to a pressure pot including a control valve which can release the liquid rubber compound 30 upon command. Alternatively, a vacuum can be applied at the first end 24 of the tube 22, and the second end 26 submerged in a vessel containing the liquid rubber compound 30. Combinations of these techniques, as well as other techniques are of course possible to accomplish the necessary step of filling the entire length of the tube 22 with a liquid rubber compound 30.

Preferably, the liquid rubber compound 30 is comprised of a liquid silicone rubber such as is well known in the art for manufacturing parts for any number of applications. One example of a curable liquid rubber compound 30 which has been suitably deployed in the context of this invention may be found in the Silastic® brand of liquid silicone rubber compounds available from the Dow Corning Coporation®. However, alternative brands of liquid rubber silicone, and indeed other liquid rubber compound types, may be used with equal effectiveness.

Some method of preventing escape of the uncured liquid rubber compound 30 from the first 24 and second 26 ends of the tube 22 must be deployed. Plugs, caps or other suitable methods for sealing the ends 24, 26 of the tube 22 are required to prevent the escape of the uncured liquid rubber compound 30. In the preferred embodiment of this invention, however, this is accomplished by joining the first 24 and second 26 ends of the tube 22 in end-to-end fashion, as perhaps best shown in FIGS. 4 and 6. According to this technique, the ends 24, 26 of the tube 22 can be fused or otherwise welded to one another in a butt joint or scarf joint type configuration, or may be joined with the aid of a mechanical connector like that shown in FIG. 5. In this example, the connector 34 comprises a short length of resilient, elastomeric tubing which is inserted approximately half way into the first end 24 of the tube 22. The extending portion of the connector 34 thus forms a tenon which can be inserted into the second end 26 of the tube 22 to perfect a mechanical joint therebetween and create a continuous loop of the tube 22 filled with the liquid rubber compound 30. The smooth-walled tubing section representing the connector 34, as depicted in FIG. 5, is adapted to slide with a clearance fit into the hollow interior of the tube 22, making contact with its inner wall 28 in a slight frictional manner. Those skilled in the art will immediately appreciate alternative forms and methods of joining the first 24 and second 26 ends of the tube 22. For example, FIG. 5A depicts an alternative connector 134 of a so-called double-ended Christmas Tree style configuration. Here, a central stem 136 supports a plurality of ribs 138. The ribs 138 may or may not have a generally conical back-slant forming barb-like skirts to resist disassembly. The ribs 138 may be of varying diameters, with the largest diameter ribs making contact with the inner wall 28 of the tube 22. The smaller diameter ribs 138 will be surrounded by the liquid rubber compound 30, and thus form anchors once the liquid rubber compound 30 is cured. Of course, many variations of the connector 34, 134 are also possible.

The joined ends 24, 26 of the tube 22 form a seam 36 as shown in FIG. 6. To improve handling of the joined tube 22 which is filled with liquid rubber compound 30, it may be advantageous to locally cure the liquid rubber compound 30 immediately adjacent the seam 36 as a precursor to subsequent operations. Thus, as illustrated in FIG. 6, the tube 22 in the area of the seam 36 may be subjected to heat from a heat source 38 to accelerate the curing process for the encased liquid rubber compound 30. This has the effect of permanently locking the tube 22 in its looped configuration, with the first 24 and second 26 ends abutting one another around the connector 34. Once the rubber compound 30 has been cured in the area of the seam 36, the tube 22 can be more easily handled without fear of uncured liquid rubber compound 30 escaping from the tube 22.

Although the curing operation is illustrated in FIG. 6 as being accomplished by a heat source 38, this mechanism is entirely dependent upon the characteristics of the liquid rubber compound 30 being used. For example, if the liquid rubber compound 30 is, instead of heat, best cured through use of ultraviolet light, radiation, vibration, or any other mechanism, a suitable device can be employed, instead of the heat source 38, to accomplish the localized curing adjacent the seam 36.

Figure 7:
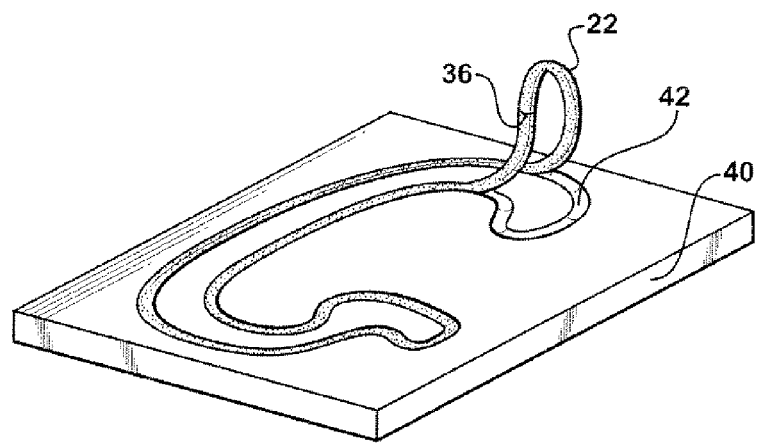
FIG. 7 is an exemplary perspective view illustrating the step of laying up the tube filled with uncured liquid rubber in a mold form.
Figure 8:
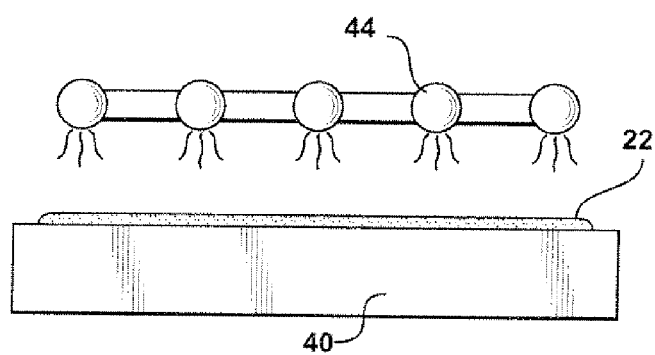
FIG. 8 is a side elevation view showing the tube supported in the mold form and exposed to heat for curing the liquid rubber compound while holding the tube stationary relative to the mold form.

The tube 22 thus formed in a sturdy continuous loop is then transferred to a mold form 40, as shown in FIGS. 7 and 8. The mold form 40 is provided with a complex geometrical feature 42 which replicates the complex geometrical contact region of two mating surfaces to be sealed by the finished gasket assembly 20. In this case, the complex geometrical feature 42 takes the form of a two-dimensional trough or groove in the mold form 40. Alternatively, the complex geometrical feature can be established by any method, including positive features extending upwardly from the mold form 40, such as walls, pins, or other features. Also, although the mold form 40 shown in FIG. 7 is of the two-dimensional variety, it is fully contemplated the complex geometrical feature 42 could be established in three dimensions, wherein the tubing 22 is laid up in both horizontal and vertical directions. Because the tube 22 is highly resilient, it readily conforms to any complex geometrical feature 42 which may be defined. Furthermore, because the liquid rubber compound 30 contained within the tube 22 is in liquid form, except for the short region adjacent the seam 36, there is no resistance at this stage to routing the tube 22 in tight turns, twists and other complex geometrical shapes.

Figure 10:
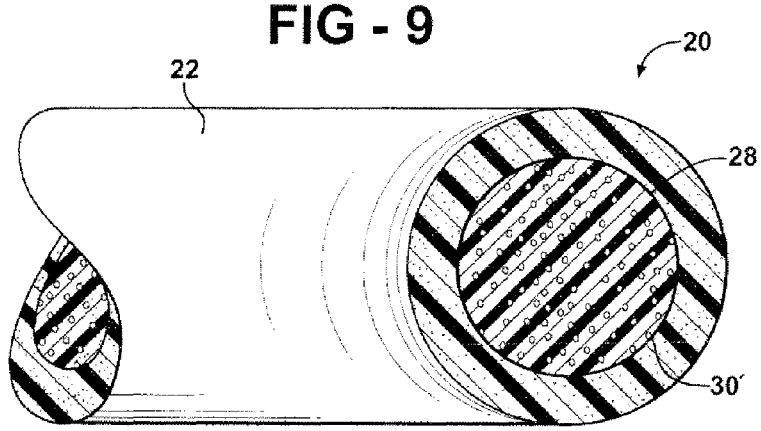
FIG. 10 is a fragmentary cross-sectional view taken generally along lines 10-10 in FIG. 9.
Figure 11:
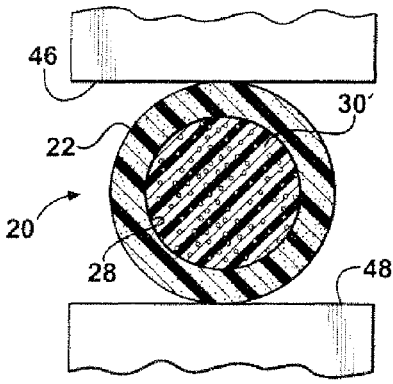
FIG. 11 is an illustrative view depicting the tube filled with cured rubber compound being disposed between two mating surfaces to be sealed.
Figure 12:
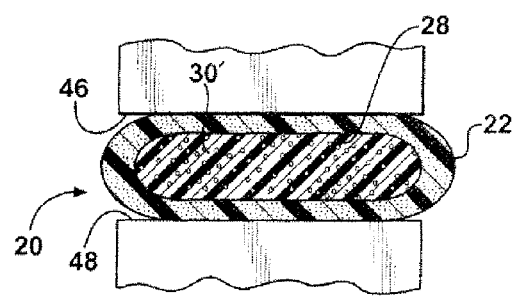
FIG. 12 is a cross-sectional view as in FIG. 11, but showing the tube filled with cured rubber compound being compressed between the two mating surfaces to perfect a seal therebetween.

Once the tube 22 has been laid up in the mold 40, the mold 40 is transferred to a curing station, such as depicted in FIG. 8. Here, a heat source 44 accelerates curing of the liquid rubber compound 30 within the tube 22 until it hardens to a final specified durometer. In the subsequent drawing figures, the cured rubber compound is identified by 30', so as to distinguish the core material in the cured condition from its earlier, liquid form. Thus, as shown in FIGS. 10-12, the cured rubber compound 30' is disposed within and fully fills the interior region of the tube 22. As described above, the heat source 44 may be substituted by other accelerated curing mechanisms, depending upon the characteristics of the liquid rubber compound 30 used.

Figure 9:
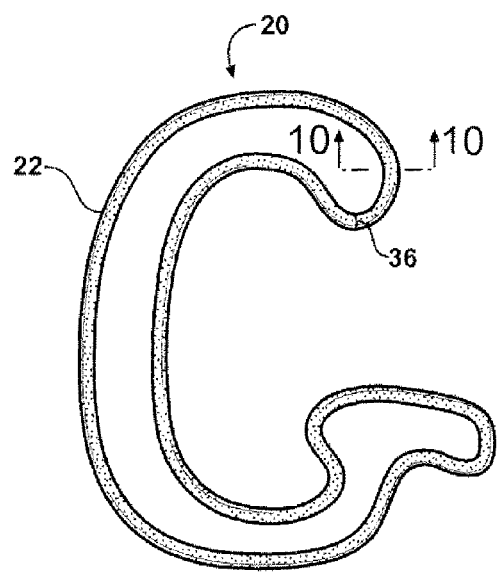
FIG. 9 is a front elevation view of the tube filled with cured rubber compound having been removed from the mold form such that the tube retains the complex geometric shape of the mold form.

FIG. 9 illustrates the completed gasket assembly 20 as removed from the mold form 40. Here, it is evident that the tube 22 is forced to retain the complex geometric shape of the mold form feature 42, due to the core of cured rubber compound 30' contained therein. In other words, although the curing process has little or no effect upon the tube 22, such that the tube 22 continually strains toward its natural, generally straight configuration, the core of cured rubber compound 30' forcibly holds the tube 22 in the complex geometrical shape of the mold form 40 much like an inner skeletal feature. Accordingly, whereby the prior art depictions of tubes filled with a curable liquid material rely upon the exterior tube to act as an exoskeleton holding the final gasket in its round configuration, the subject invention relies upon the core of cured rubber compound 30' to act as an inner skeletal feature forcibly holding the complex geometrical shape in opposition to the tube 22 continually but unsuccessfully urging the gasket assembly 20 toward a straightened configuration.

In the preferred embodiment of this invention, the cured rubber compound 30' forming the core of the gasket assembly 20 is selected from a material that will achieve a durometer, when fully cured, of no greater than 35 Shore A. Thus, the tube 22 and the cured rubber compound 30' have different durometer measures. It is contemplated, however, that these differences could be inverted, if desired, such that the core of the gasket assembly 20 possesses a higher durometer measure than that of the tube 22. In any event, the resistance to bending in the cured rubber compound 30' must be sufficient to overcome the natural strain of the tubing 22 and thus hold the gasket assembly 20 in the as-molded, complex geometrical configuration.

Preferably, the connector 34, 134 is fabricated from a material which is resilient and has a durometer measure generally equal to the specified durometer of the cured rubber compound 30'. Thus, if the core of cured rubber compound 30' is selected from a material having a durometer of no greater than 35 Shore A, then the connector 34, 134 may be fabricated from a resilient rubber material also having a durometer of no greater than 35 Shore A. In this manner, the compressibility of the seam 36 will be substantially identical to the compressibility of the gasket assembly 20 in regions remote from the seam 36. As a result, the gasket assembly 20 will be better suited to perfect a seal between the mating surfaces when placed into service across its entire length, without creating stress concentrations in the region of the seal 36.

FIGS. 11 and 12 illustrate placing the finished gasket assembly 20 into service, by placing the gasket assembly 20 between two mating surfaces 46, 48 to be sealed. As explained above, these mating surfaces 46, 48 represent a complex geometrical contact region mimicked in the feature 42 of the mold form 40. In order to perfect a seal between the mating surfaces 46, 48, the gasket assembly 20 is compressed, thereby flattening the otherwise generally annular construction of the tube 22 and affecting a corresponding disruption in the shape of the cured rubber compound 30'. The resistance to compression exerted by the gasket assembly 20 establishes the necessary fluid and/or air-tight seal between the mating surfaces 46, 48.

The subject gasket assembly is particularly well suited for cold static sealing applications over a particularly complex geometrical contact region. The gasket assembly 20 can be fabricated using materials generally commercially available, and is particularly well suited for high volume production applications. The gasket assembly 20 can be manufactured in a factory and then shipped, ready for installation, holding a shape in the necessary complex geometrical configuration corresponding to the in-service mating surfaces 46, 48.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A shaped gasket of the type for sealing two mating surfaces over a non-circular geometrical contact region, said gasket comprising:

a hollow, resilient tube extending continuously between first and second ends, said tube having a naturally straight configuration but easily bent into predetermined non-circular configurations, said first and second ends joined together in end-to-end fashion;

a core of cured liquid rubber compound completely filling said hollow, resilient tube; and said core of cured liquid rubber compound being set in a non-circular geometric shape whereby said hollow, resilient tube is forcibly held in the non-circular geometric shape by said core of cured rubber compound while said tube continually strains toward a straight configuration.

2. The gasket of claim 1 further including a connector disposed inside said tube and joining said first and second ends together.

3. The gasket of claim 2 wherein said connector is fabricated from a resilient rubber material.

4. The gasket of claim 3 wherein said cured liquid rubber compound has a specified durometer, and said connector has a durometer generally equal to the durometer of said cured rubber compound.

5. The gasket of claim 3 wherein said connector includes a central stem and at least one rib extending into said first end of said tube and at least one rib extending into said second end of said tube.

6. The gasket of claim 1 wherein said tube is fabricated from a resilient rubber material having a durometer of at least 60 Shore A, and said cured liquid rubber compound has a durometer of no greater than 35 Shore A.

7. The gasket of claim 6 wherein said tube and said cured rubber compound are each fabricated from silicone rubber.

\* \* \* \* \*